Patented July 29, 1941

2,251,216

UNITED STATES PATENT OFFICE 2,251,216

SULPHUR REMOVAL FROM GASES

John C. Woodhouse, Cragmere, Del., assignor to E. I. du Pont de Nemours & Company, Wilmington, Del., a corporation of Delaware No Drawing. Application October 4, 1939, Serial No. 297,867

11 Claims. (Cl. 23—2)

This invention relates to the separation of acidic sulphur-containing gases from gaseous mixtures. More particularly, this invention relates to the separation of sulphur-containing acidic gases from gas mixtures by means of an absorbent.

A number of methods have previously been proposed for the removal of acid gases from mixtures of gases contaminated with hydrogen sulphide, sulphur dioxide and the like, some of these methods usually involving the formation of salts of the acid gases, the salts subsequently being decomposed, usually by heating, to regenerate the solution utilized as an absorbent and to drive off the gas absorbed.

It is an object of the present invention to overcome disadvantages inherent in chemical reaction processes previously utilized for removal of acidic gases from mixtures containing them. It is a further object of the present invention to provide a new and improved process involving use of an absorbent which is believed to act in a purely physical manner and not to involve chemical reaction.

Other objects and advantages of the present invention will be apparent from the following specification.

According to the present invention separation and recovery of sulphur-containing acidic gases from mixtures containing them are accomplished by use of a solvent or absorbent which is a mono- or di-alkyl nitrogen-substituted amide of formic, acetic, or methoxy acetic acid. Thus, for example, acidic sulphur-containing gases such as $SO_2$, $H_2S$ and $COS$ may be separated from gas mixtures containing them by passing the gaseous mixture through liquid dimethyl formamide, dimethyl acetamide, or dimethyl methoxy acetic acid amide which are specific dialkyl N-substituted acid amides within the broad purview of this invention. Specific gases which may be treated according to this invention include, refinery, natural and flue gases, particularly smelter's flue gases, which contain varying amounts of acidic sulphur-containing gases, such as sulphur dioxide and hydrogen sulphide.

The solvents or absorbents of this invention dissolve large quantities of acidic sulphur-containing gases at normal atmospheric pressure and normal temperatures. The solution of the sulphur-containing gas in the amide is apparently purely physical in nature for none of the solvents of this invention are basic materials in the sense that amines, for example, are bases. Upon heating the amide solutions of sulphur-containing gases, the gas is expelled smoothly and the solvent is capable of absorbing more gas after cooling. Reduction of pressure over the gas solution is equally effective in releasing gas.

The process of this invention may be carried out in various types of apparatus and may be carried out as a continuous or intermittent operation. Preferably, however, an absorber of suitable height and provided with baffles to effect reduced rate of flow of downflowing liquid and upflowing gas is utilized. Within this absorber the solvent is continuously delivered at the top while the gas to be treated is passed into the lower part to continue upwardly through the absorber in intimate contact with the downflowing liquid solvent. The solvent through which the gas has been passed, containing the sulphur-containing gas which it is desired to remove, may be conducted to an additional vessel wherein it may be heated in order to drive off the sulphur-containing gas, and this solvent then recycled to the absorber for further use as an absorbing solution. Various methods and arrangements of apparatus will be aparent to those skilled in the art and the temperatures and pressures under which the absorption process is carried on may be varied over a wide range dependent upon the degree of absorption desired of the sulphur-containing gas.

The temperatures at which absorption of gases is carried on is kept low and may approach the freezing point of the absorbent. In the case of dimethyl acetamide, for example, the freezing point is −21° C., and although not preferred, temperatures only slightly above this temperature may be utilized if desired when employing this material as an absorbent. Preferably, however, the temperature at which the absorption of acid gases is carried on is kept in the neighborhood of 0° to 20° C., and the temperature to which the solutions are heated for the object of driving off absorbed gases is also low, preferably of the order of about 70° C. at its maximum. The regeneration of the solutions, or driving off of the gases may, if desired, be carried on at much lower temperatures by use of reduced pressures. Optionally, absorption of gases may be carried out at elevated pressures, and regeneration of absorbent may be done by reduction of pressure to approximately one atmosphere. Change in temperature may be employed to assist in the cycle along with change in pressure.

The following examples, although not limiting, will serve to illustrate how this invention may be practiced.

Example 1

A sulphur dioxide-containing gas was passed into a body of liquid dimethyl formamide, maintained at 20° C. The dimethyl formamide readily absorbed sulphur dioxide from the gas until saturation, at which point each gram of dimethyl formamide contained 1.432 grams of sulphur dioxide, at 20° C. Thereafter, in order to regenerate the solvent, the dimethyl formamide was agitated and heated slowly during agitation to 70° C., in order to evolve sulphur dioxide. After reaching 70° C. the solution was quickly cooled, and was found to contain 0.430 grams of sulphur dioxide per gram of dimethyl formamide. The dimethyl formamide was thereafter reutilized for absorption of further quantities of sulphur dioxide.

Example 2

In a manner similar to that described in Example 1, dimethyl acetamide was utilized in place of dimethyl formamide. At 20° C. the saturated solution of dimethyl acetamide contained 1.196 grams of sulphur dioxide per gram of dimethyl acetamide, and at 70° C., 0.414 gram of sulphur dioxide per gram of dimethyl acetamide.

Example 3

In a manner such as described in Examples 1 and 2 above, hydrogen sulphide-containing gas was passed into dimethyl formamide maintained at 20° C. The dimethyl formamide readily absorbed the hydrogen sulphide until saturation, at which point each gram of dimethyl formamide contained 0.06999 gram of hydrogen sulphide per gram of dimethyl formamide. After regeneration as described in Example 1, the dimethyl formamide was found to contain 0.01751 gram of hydrogen sulphide per gram of dimethyl formamide.

Example 4

Dimethyl acetamide was utilized in a method such as described in Example 3 and the saturated solution at 20° C. contained 0.07735 gram of hydrogen sulphide per gram of dimethyl acetamide, and at 70° C., 0.03186 gram of hydrogen sulphide per gram of dimethyl acetamide.

Example 5

In a manner similar to that described in the preceding examples, hydrogen sulphide was passed at 20° C. into dimethyl methoxy acetamide and at this temperature 40.4 cc. of hydrogen sulphide was dissolved in each cc. of dimethyl methoxy acetamide.

Although in each of the examples batch operation has been described, it will be understood that this is not a limitation upon the present invention, inasmuch as the present invention may be carried out in a continuous, as well as batch, operation.

Various changes may be made in the details and preferred embodiments of this invention without departing therefrom or sacrificing the advantages thereof.

I claim:

1. The process of separating an acidic sulphur-containing gas from gaseous mixtures which comprises effecting contact of a gaseous mixture containing an acidic sulphur-containing gas with an absorbent agent in liquid form selected from the group consisting of normally liquid mono- and dialkyl N-substituted aliphatic acid amides and thereafter regenerating the absorbent.

2. The process of separating an acidic sulphur-containing gas from gaseous mixtures which comprises effecting contact of a gaseous mixture containing an acidic sulphur-containing gas with an absorbent agent in liquid form selected from the group consisting of normally liquid mono- and dialkyl N-substituted amides of formic, acetic and methoxy acetic acid and thereafter regenerating the absorbent.

3. The process of separating an acidic sulphur-containing gas from gaseous mixtures which comprises effecting contact of a gaseous mixture containing an acidic sulphur-containing gas with a solution containing a material selected from the group consisting of normally liquid mono- and dialkyl N-substituted amides of formic, acetic and methoxy acetic acid and thereafter regenerating the absorber.

4. The process of separating an acidic sulphur-containing gas from gaseous mixtures which comprises effecting contact of a gaseous mixture containing an acidic sulphur-containing gas with a solution which is liquid at ordinary temperatures containing a material selected from the group consisting of normally liquid mono- and dialkyl N-substituted amides of formic, acetic and methoxy acetic acid and thereafter regenerating the absorbent.

5. The process of separating an acidic sulphur-containing gas from gaseous mixtures which comprises effecting contact of a gaseous mixture containing an acidic sulphur-containing gas with an absorbent agent, at a temperature above the freezing point of the absorbent, selected from the group consisting of normally liquid mono- and dialkyl N-substituted amides of formic, acetic and methoxy acetic acid and thereafter regenerating the absorbent.

6. The process of separating an acidic sulphur-containing gas from gaseous mixtures which comprises effecting contact of a gaseous mixture containing an acidic sulphur-containing gas with an absorbent agent, at a temperature in the range of 0° C. to 20° C., selected from the group consisting of normally liquid mono- and dialkyl N-substituted amides of formic, acetic and methoxy acetic acid and thereafter regenerating the absorbent.

7. The process of separating acidic sulphur-containing gas from gaseous mixtures which comprises effecting contact of a gaseous mixture containing an acidic sulphur-containing gas with liquid dimethyl formamide and thereafter regenerating the dimethyl formamide.

8. The process of separating acidic sulphur-containing gas from gaseous mixtures which comprises effecting contact of a gaseous mixture containing an acidic sulphur-containing gas with liquid dimethyl acetamide and thereafter regenerating the dimethyl formamide.

9. The process of separating acidic sulphur-containing gas from gaseous mixtures which comprises effecting contact of a gaseous mixture containg an acidic sulphur-containing gas with liquid dimethyl formamide at a temperature in the range of 0° C. to 20° C. and thereafter regenerating the dimethyl formamide.

10. The process of separating acidic sulphur-containing gas from gaseous mixtures which comprises effecting contact of a gaseous mixture containing an acidic sulphur-containing gas with liquid dimethyl acetamide at a temperature in the range of 0° C. to 20° C. and thereafter regenerating the dimethyl acetamide.

11. The process of separating an acidic sulphur-containing gas from gaseous mixtures which comprises effecting contact of a gaseous mixture containing an acidic sulphur-containing gas with an absorbent agent in liquid form selected from the group consisting of normally liquid mono- and dialkyl N-substituted amides of formic, acetic and methoxy acetic acid and thereafter heating the resultant liquid absorbent to drive off the absorbed acidic sulphur-containing gas.

JOHN C. WOODHOUSE.

CERTIFICATE OF CORRECTION.

Patent No. 2,251,216. July 29, 1941.

JOHN C. WOODHOUSE.

It is hereby certified that error appears in the printed specification of the above numbered patent requiring correction as follows: Page 2, second column, line 18, claim 3, for "absorber" read --absorbent--; line 60, claim 8, for "formamide" read --acetamide--; line 64, claim 9, for "containg" read --containing--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.

CERTIFICATE OF CORRECTION.

Patent No. 2,251,216.　　　　　　　　　　　July 29, 1941.

JOHN C. WOODHOUSE.

It is hereby certified that error appears in the printed specification of the above numbered patent requiring correction as follows: Page 2, second column, line 18, claim 3, for "absorber" read --absorbent--; line 60, claim 8, for "formamide" read --acetamide--; line 64, claim 9, for "containg" read --containing--; and that the said Letters Patent should be read with this correction therein that the same may conform to the record of the case in the Patent Office.

Signed and sealed this 30th day of September, A. D. 1941.

(Seal)　　　　　　　　　　　　　　　　　Henry Van Arsdale,
　　　　　　　　　　　　　　　　　　Acting Commissioner of Patents.